United States Patent
Cho

(10) Patent No.: US 9,849,589 B2
(45) Date of Patent: Dec. 26, 2017

(54) METHOD AND SYSTEM FOR LOCALIZING MOBILE ROBOT USING EXTERNAL SURVEILLANCE CAMERAS

(71) Applicant: GACHON UNIVERSITY OF INDUSTRY-ACADEMIC COOPERATION FOUNDATION, Seongnam-si, Gyeonggi-do (KR)

(72) Inventor: Young-Im Cho, Seoul (KR)

(73) Assignee: Gachon University of Industry-Academic Cooperation Foundation, Seongnam-si (KR)

( * ) Notice: Subject to any disclaimer, the term of this patent is extended or adjusted under 35 U.S.C. 154(b) by 46 days.

(21) Appl. No.: 15/188,709

(22) Filed: Jun. 21, 2016

(65) Prior Publication Data
US 2017/0252925 A1 Sep. 7, 2017

(30) Foreign Application Priority Data

Mar. 2, 2016 (KR) .................. 10-2016-0025126

(51) Int. Cl.
*G06F 19/00* (2011.01)
*B25J 9/16* (2006.01)
*B25J 19/02* (2006.01)

(52) U.S. Cl.
CPC .......... *B25J 9/1666* (2013.01); *B25J 19/021* (2013.01); *G05B 2219/40476* (2013.01); *G05B 2219/40519* (2013.01); *Y10S 901/01* (2013.01)

(58) Field of Classification Search
CPC ............... B25J 9/1666; B25J 19/021; G05B 2219/40476; G05B 2219/40519; Y10S 901/01

USPC ................................ 700/245, 255
See application file for complete search history.

(56) References Cited

U.S. PATENT DOCUMENTS

| | | | | |
|---|---|---|---|---|
| 8,731,295 B2* | 5/2014 | Schepelmann | ...... | A01D 34/008 |
| | | | | 382/164 |
| 9,436,880 B2* | 9/2016 | Bos | ......... | B60N 2/002 |

FOREIGN PATENT DOCUMENTS

| | | |
|---|---|---|
| JP | 2012-215959 | 11/2012 |
| KR | 10-2009-0070258 | 7/2009 |
| KR | 10-2009-0095761 | 9/2009 |
| KR | 10-1203816 | 10/2012 |

OTHER PUBLICATIONS

Korean Office Action dated Apr. 17, 2017 of the corresponding Korean Patent Application No. 10-2016-0025126 (11 pages), noting listed references in this IDS.

* cited by examiner

*Primary Examiner* — Ronnie Mancho
(74) *Attorney, Agent, or Firm* — Lewis Roca Rothgerber Christie LLP

(57) ABSTRACT

A mobile robot employing a method and a system for localizing the mobile robot using external surveillance cameras acquires images from the surveillance cameras installed indoors adjacent to each other, recognizes objects included in the images by removing shadows from the images and performing a homography scheme, and avoids the recognized objects. The mobile robot employing the method and the system for localizing the mobile robot using the external surveillance cameras enables rapider localization and lower price as compared with a conventional image-based autonomous robot, so that the commercialization of a service robot is accelerated.

20 Claims, 14 Drawing Sheets

METHOD AND SYSTEM FOR LOCALIZING MOBILE ROBOT USING EXTERNAL SURVEILLANCE CAMERAS

CROSS-REFERENCE TO RELATED APPLICATION

This application claims the benefit under 35 U.S.C. §119 of Korean Patent Application No. 10-2016-0025126 filled on Mar. 2, 2016 in the Korean Intellectual Property Office, the entirety of which disclosure is incorporated herein by reference.

BACKGROUND OF THE INVENTION

1. Field of the Invention

The present invention relates to a localization system and a localization method capable of controlling a mobile robot, and more particularly, to a method of localizing an obstacle existing indoors using images photographed by two indoor cameras, and to a system for localizing and avoiding an object, that is, the obstacle included in the images through the method to move to a destination.

2. Description of the Related Art

In order for a mobile service robot to move indoors or outdoors, a localization technology is required to detect the location of the robot based on surrounding information, and has been variously studied. In general, the service robot obtains the surrounding information using a sensor mounted on the robot for the localization, and creates location information and a location map. In this case, although the robot is applicable to various environments, the price of the robot is increased, and a complex control structure is required in the robot for the application to the various environments. However, since the structure of an indoor space may be previously recognized, there have been studied various schemes of receiving a signal from an external device using the minimum sensors for a robot or performing localization using a specific mark. In detail, there have been studied a localization scheme of measuring the intensity of a radio frequency (RF) signal received by a terminal in, for example, the wireless local area network (WLAN), and measuring a signal transmission distance to calculate a location, a scheme of finding out the location of a robot using the difference in a transfer rate between a faster RF signal and a slower ultrasonic wave, and a localization scheme based on an artificial landmark attached to an interior and having an intrinsic pattern. However, in the above studies, since external equipment must be additionally mounted, the mounting and the maintenance of the equipment are difficult and low precision is represented with respect to localization. Accordingly, there is required a scheme of finding out and transmitting location information and an environmental map of a robot by an external device, such as a global positioning system (GPS) sensor, so that the robot may receive the location information.

In general, a surveillance camera for an indoor environment is installed in each building without a dead zone, and analyzes and processes image information because the image information is collected through a central server. When the surveillance camera installed indoors is used, the location information of an object or a robot may be found out based on environment information included in an image, a map may be created, and location information may be transmitted to a robot so that the mobile robot may move to a destination without an additional sensor. In addition, the surveillance camera may be applied to a plurality of robots.

However, problems may occur in a localization scheme based on an image of the surveillance camera installed indoors as follows. First, distortion may be caused by a lens of a low-price camera, and a shadow may be made by light. In this case, to exactly obtain the image of an object, the distortion of the image must be corrected, and the shadow made by a light source must be removed. Second, the information of a region covered by an object included in a single image may not be recognized from only the single image. To find out the location and the size of the object, environment information must be complemented using information of an image photographed at a different angle and having the information of the covered region.

Patent document 1 (Korean Patent Registration No. 1203816 (issued on Nov. 15, 2012) has a limitation that a marker must be previously provided in a space where a localization system is placed in order to find out the location of the object.

Patent document 2 (Korean Unexamined Patent Publication No. 2009-0095761 (published on Sep. 10, 2009) discloses a robot vision system having a stereo panoramic camera, in which the camera is provided in the system, so that the cost of system realization is increased.

SUMMARY OF THE INVENTION

An objective of the present invention is to provide a localization method capable of creating a multi-image based 2-D map having location information of an object and a robot using images by existing surveillance cameras installed on an corridor environment, and enabling a mobile robot to move to a destination while avoiding the collision with an obstacle using map information.

Another objective of the present invention is to provide a localization system capable of localizing a robot without mounting a sensor on the robot by controlling the location of the robot using only images, and enabling the robot to travel while avoiding an obstacle, thereby contributing to the increase in price competition of a service robot.

The objectives of the present invention are not limited to the above-mentioned objectives, and other objectives will be clearly understood from the following description by those skilled in the art.

In order to accomplish the objects of the present invention, there are provided a method and a system for localizing a mobile robot using external surveillance cameras according to an exemplary embodiment of the present invention.

The system for localizing the mobile robot using the external surveillance cameras includes a control unit that recognizes an object and an obstacle included in received surveillance camera images through a shadow removing scheme and a homography scheme, creates a moving path to allow travelling while avoiding the object and the obstacle, and generates a corresponding control signal to control components other than the control unit, a sensing unit that senses a steering angle and rotation of a driving motor and transmits the steering angle and the rotation of the driving motor to the control unit, a traveling unit that generates driving force by the control signal, a steering unit that performs steering along the moving path by the control signal, a communication unit that transmits images, which is acquired from the surveillance cameras, to the control unit, and a power supply unit that supplies power to components other than the power supply unit.

The method of localizing the mobile robot using the external surveillance cameras, includes converting original images acquired from indoor surveillance cameras installed adjacent to each other to binary images and removing shadows from the binary images, merging the binary images having no shadows with each other through a homography scheme, recognizing locations and sizes of objects included into the original images through a contour scheme, and compensating for errors of the recognized locations and sizes of the objects, and mapping the objects having the compensated locations and sizes with an image of a real floor, which is merged with a grid.

In addition, the system for localizing the mobile robot using the external surveillance cameras may include an embodiment configured to further include a proximity sensor or a distance sensor provided on one side of an outer portion of a shadow removing system, an embodiment in which the traveling unit includes a BLDC motor, and the steering unit includes a stepping motor, an embodiment of including the communication unit to make communication with external devices, such as the surveillance cameras, using various communication protocols including a Zigbee wireless communication protocol, an embodiment in which the sensing unit includes a camera or a vision sensor, and an embodiment in which the traveling unit includes a moving unit in addition a wheel.

In addition, the method of localizing the mobile robot using the external surveillance cameras may include an embodiment of further including planning a moving path based on the mapping after the mapping of the objects having the compensated locations and sizes, an embodiment of further including marking the planed moving path and an actual traveling path on a same map and calculating an error bound between the moving path and the traveling path, and transmitting the error bound to an external system, after the planning of the moving path and the actual traveling of the mobile robot along the planed moving path, an embodiment in which a square lattice or grid including gradations spaced at a predetermined interval is displayed together with the moving path and the traveling path on the map having the planed moving path and the actual traveling path that are marked thereon, and an embodiment in which the external system to which the error bound is transmitted stores and processes error bounds transmitted from a plurality of mobile robots, and transmits the stored error bound or a processing result to an outside.

The details of other embodiments are incorporated in "DETAILED DESCRIPTION OF THE INVENTION" and accompanying "Drawings".

The advantages and/or features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

As described above, in the method and the system for localizing the mobile robot using the external surveillance cameras according to the exemplary embodiment of the present invention and having the above configuration, the robot can be localized without the mounting of the sensor on the robot, and can travel to the destination while avoiding the obstacle.

Further, since the robot employing the method and the system for localizing the mobile robot using the external surveillance cameras according to the exemplary embodiment of the present invention can be localized without a sensor, and travel to the destination while avoiding the obstacle, the price competition of the robot can be increased.

Further, the robot employing the method and the system for localizing the mobile robot using the external surveillance cameras according to the exemplary embodiment of the present invention is configured without the camera or the vision sensor. Accordingly, the configuration of the robot can be simplified, the failure rate of the robot can be lowered, the control load of the robot can be lowered, and the maintenance of the robot can be simplified.

BRIEF DESCRIPTION OF THE DRAWINGS

FIG. 5A shows a plane Q of an original image, and FIG. 5B shows a plan q of the air view image.

FIG. 7A, FIG. 7B and FIG. 7C show homography projection images by two surveillance cameras among images used in the method and system for localizing the mobile robot using the external surveillance cameras according to the exemplary embodiment of the present invention, in which FIG. 7A shows original images of two surveillance cameras, FIG. 7B shows binary images obtained by removing a shadow effect from the original images of FIG. 7A, and FIG. 7C shows images obtained by projecting the images of FIG. 7B through the homography scheme.

FIG. 10A and FIG. 10B show parts of the images used in the method and system for localizing the mobile robot using the external surveillance cameras according to the exemplary embodiment of the present invention, and in detail, show lattice images used to measure the location error of the object region which is visually detected, in which FIG. 10A shows an image by camera 1, and FIG. 10B is an image by camera 2.

DETAILED DESCRIPTION OF THE INVENTION

Figure 1:
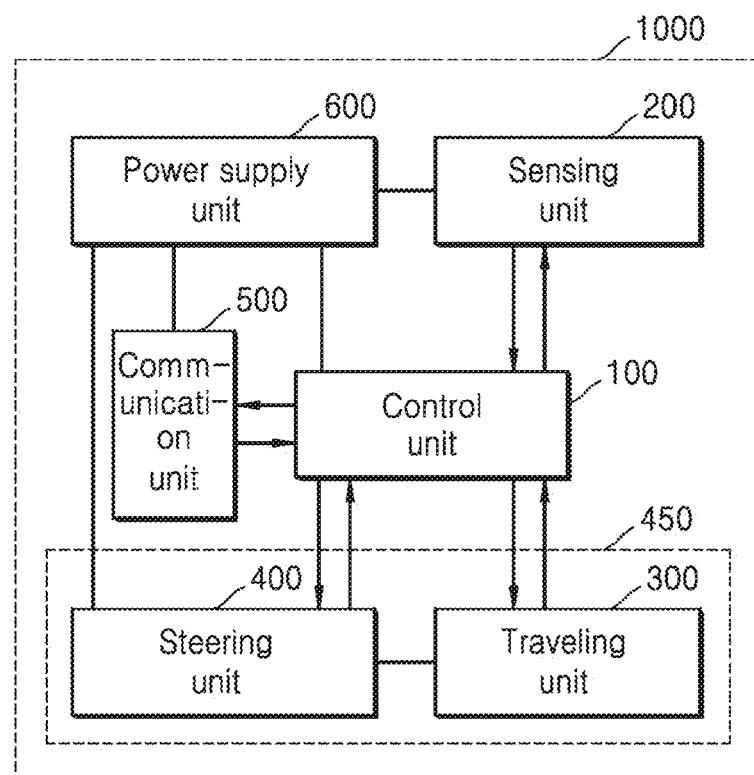
FIG. 1 is a block diagram schematically showing the configuration of a system for localizing a mobile robot using external surveillance cameras according to the exemplary embodiment of the present invention.

Hereinafter, some exemplary embodiments of the present invention will be described in detail with reference to accompanying drawings.

Before the detailed description of the present invention, terms and words used in the specification shall not be interpreted as commonly-used dictionary meanings, but shall be interpreted as to be relevant to the technical scope of the invention based on the fact that the inventor may properly define the concept of the terms to explain the invention in best ways.

In other words, the terms are only used in the specification to explain the exemplary embodiment of the present invention, and not used to limit the scope of the present invention. In addition, those skilled in the art should understand that the terms are defined in consideration with various possibilities of the present invention.

Further, in the following description, a predetermined component expressed in the singular may contain a plurality of components unless otherwise indicated. Similarly, components expressed in the plural may contain a singular concept.

Throughout the whole detailed description, when a predetermined component "includes" another component, the predetermined component does not exclude other components, but may further include other components unless otherwise indicated.

Further, those skilled in the art should understand the following. When it is described that a predetermined component "exists in another component, or is installed in connection with" another component, the predetermined component may be directly connected with another component, may be installed in contact with another component, or may be spaced apart from another component by a predetermined distance. If the predetermined component is spaced apart from another component by the predetermined distance, a third component or a third unit may be provided to fix or connect the predetermined component to another component, and the details of the third component or unit may be omitted.

Meanwhile, those skilled in the art should understand that, when the predetermined component is "directly linked to or directly connected with" another component, the third component or the third unit is not provided.

Similarly, other expressions to explain the relationships among components, that is, "~between", "~immediately between", "~adjacent to", and "~directly adjacent to" should be interpreted under the same intent.

In the following description, the terms of "one surface", "opposite surface", "one side", "opposite side", "first", and "second", if used, are used to clearly distinguish between one component and a different component, and the meanings of relevant components should not be limitingly interpreted due to the terms.

Further, in the following description, terms of "on", "under", "left", and "right" related to a position, if used, should be interpreted as representing a relative position of a relevant component in a relevant drawing. In addition, unless the position is not specified as an absolute position, the terms related to the position should not be interpreted as representing the absolute position.

Moreover, those skilled in the art should understand that the term of "~part", "~unit", "~module", or "~device", if used, means a unit capable of processing at least one function or operation, and can be realized in hardware, software, or the combination of the hardware and the software in the detailed description of the present invention.

In the following description of the present invention, when assigning a reference numeral to each component in each drawing, the same component is assigned with the same reference numeral even if the same component is expressed in a different drawing. In other words, throughout the whole detailed description of the invention, the same reference numeral is assigned to the same component.

The sizes and the positions of components constituting the present invention, the relationship between the components may be partially exaggerated, reduced, or omitted for clarity. Accordingly, the proportion or the scale does not strict.

In addition, the details of the generally-known technology that makes the subject matter of the present invention unclear will be omitted in the following description.

FIG. 1 is a block diagram schematically showing the configuration of a system 1000 for localizing a mobile robot using external surveillance cameras according to the exemplary embodiment of the present invention.

As shown in FIG. 1, the system 1000 for localizing the mobile robot using the external surveillance cameras (localization system) according to the exemplary embodiment of the present invention includes a control unit 100, a sensing unit 200, a traveling unit 300, a steering unit 400, a communication unit 500, and a power supply unit 600.

The control unit 100 is a component to control the sensing unit 200, the traveling unit 300, the steering unit 400, and the communication unit 500 so that the localization system 1000 may travel while avoiding an obstacle. The control unit 100 receives images, which are photographed by the surveillance cameras (reference number thereof is omitted), from the communication unit 500 to remove a shadow of an object from the image, to perceive the object and an obstacle included in the image, to form a traveling path allowing the localization system 1000 and the mobile robot to travel while avoiding the object and the obstacle, and to control a driving unit 450.

The sensing unit 200 refers to an encoder (not shown) provided in the traveling unit 300 to count the rotation of a driving motor 360, and a turret encoder 420 provided in the steering unit 400 to measure a steering angle. The sensing unit 200 may further include a proximity sensor or a distance sensor.

Figure 14:
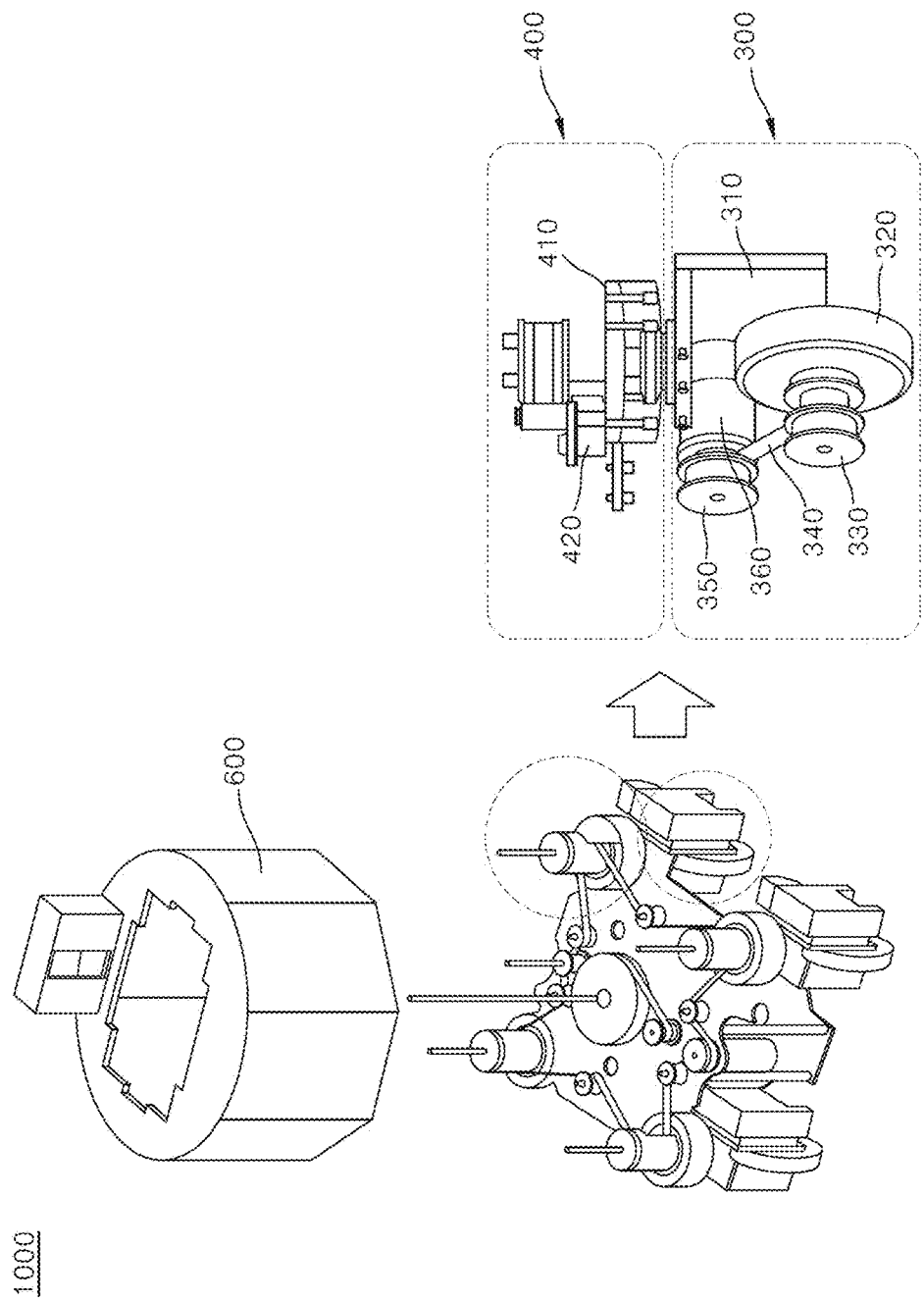
FIG. 14 is a schematic view showing the mobile robot employing the method and system for localizing the mobile robot using the external surveillance cameras according to the exemplary embodiment of the present invention, and the driving unit of the mobile robot.

The traveling unit 300, which is a unit to move the system 1000 for localizing the mobile robot using the external surveillance camera, includes a motor driver 310, a driving wheel 320, driving pulleys 330 and 350, a driving belt 340, and the driving motor 360 according to the example embodiment of the present invention (see FIG. 14).

In this case, the motor driver 310 controls a rotation direction and a rotation degree of the driving motor 360 under the control of the control unit 100.

The driving wheel 320 is directly linked to the driving pulley 330 to receive rotational force from the driving pulley 350, which is directly linked to the driving motor 360, through the driving belt 340 and thus rotate, thereby moving the localization system 1000.

The steering unit 400 includes a turret pulley 410, the turret encoder 420, and a turret motor (not shown) (see FIG. 14) to steer the traveling direction of the localization system 1000 as the turret pulley 410 is rotated if the turret motor is rotated.

The driving unit 450 refers to both of the traveling unit 300 and the steering unit 400 to move the localization system 1000.

The communication unit 500 receives the images, which are photographed by the surveillance cameras (reference number thereof is omitted), from the surveillance cameras to transmit the images to the control unit 100. In this case, preferably, a communication protocol between each of the surveillance cameras and the communication unit 500 may be a protocol of a Zigbee scheme. However, various communication protocols other than the Zigbee protocol may be employed according to work objects or work environments.

The power supply unit 600 supplies power to other components, that is, the control unit 100, the sensing unit 200, the traveling unit 300, the steering unit 400, and the communication unit 500. The control unit 100, the sensing unit 200, the control unit 100, the steering unit 400, and the communication unit 500 are directly connected with the power supply unit 600 to receive power, and the traveling unit 300 is not directly connected with the power supply unit 600, but connected with the steering unit 400 to receive the power. Alternatively, according to another embodiment, the traveling unit 300 may be directly connected with the power supply unit 600 to receive the power.

The system 1000 for localizing the mobile robot using the external surveillance camera, which includes the control unit 100, the sensing unit 200, the traveling unit 300, the steering unit 400, and the communication unit 500, may be preferably realized in the form of a mobile robot to travel while avoiding an obstacle.

In addition, the distance sensor or the proximity sensor is further provided on one side of an outer portion of the system 1000 for localizing the mobile robot using the external surveillance cameras according to the exemplary embodiment of the present invention to measure the distances among the localization system 1000, a mobile robot, and an obstacle, or to detect that the localization system 1000 and the mobile robot are in the proximity to the obstacle.

In addition, the traveling unit 300 includes a BLDC motor, and the steering unit 400 includes a stepping motor so that the lifespan of the traveling unit 300 may be extended, and a finely steering capability of the sensing unit 200 may be improved.

In addition, although the above description has been made in that the system 1000 for localizing the mobile robot using the external surveillance cameras according to the exemplary embodiment travels with a wheel as a moving unit thereof, the present invention is not limited thereto. In other words, the system 1000 for localizing the mobile robot using the external surveillance cameras according to the present invention may be applied to various robots employing various moving units such as caterpillars or legs for walking.

In addition, although FIG. 1 shows that the control unit 100 does not transmit a control signal to the power supply unit 600, the control unit 100 may be realized in such a manner of transmitting the control signal to the power supply unit 600 to control the power to be supplied to the other components.

In addition, the sensing unit 200 may further include a camera or a vision sensor, so that the activity ranges of both of the system 1000 for localizing the mobile robot using the external surveillance cameras according to the present invention and the mobile robot may be expanded to the outside as well as an interior.

Hereinafter, lines to connect the components with each other will be described with reference to FIG. 1.

Lines having no arrows at terminals thereof are power lines to supply power, which is generated from the power supply unit 600, to the components.

Lines having arrows at terminals thereof are lines to represent transmission directions of the control signal or data generated from the control unit 100, and the control signal or data are transmitted from a component connected with an end portion of a relevant line having no arrow to a component connected with an end portion of the relevant line having an arrow.

Figure 2:
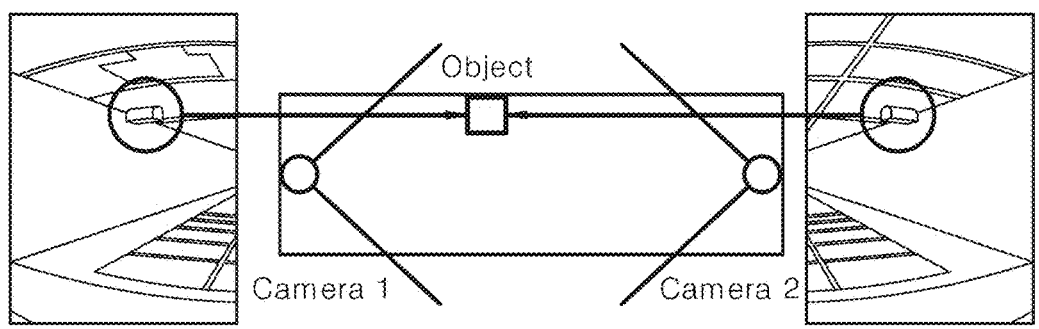
FIG. 2 is a view showing an example of preferable installation locations of the external surveillance cameras applied to the method and system for localizing the mobile robot using the external surveillance cameras according to the exemplary embodiment of the present invention.

FIG. 2 is a view showing an example of preferable installation locations of the external surveillance cameras applied to the method and system for localizing the mobile robot using the external surveillance cameras according to the exemplary embodiment of the present invention.

In this case, the external surveillance cameras, which are installed indoors outside the robot, are preferably installed on two opposite sides of an indoor space, so that the information of the region covered by the object may be complemented.

Figure 3:
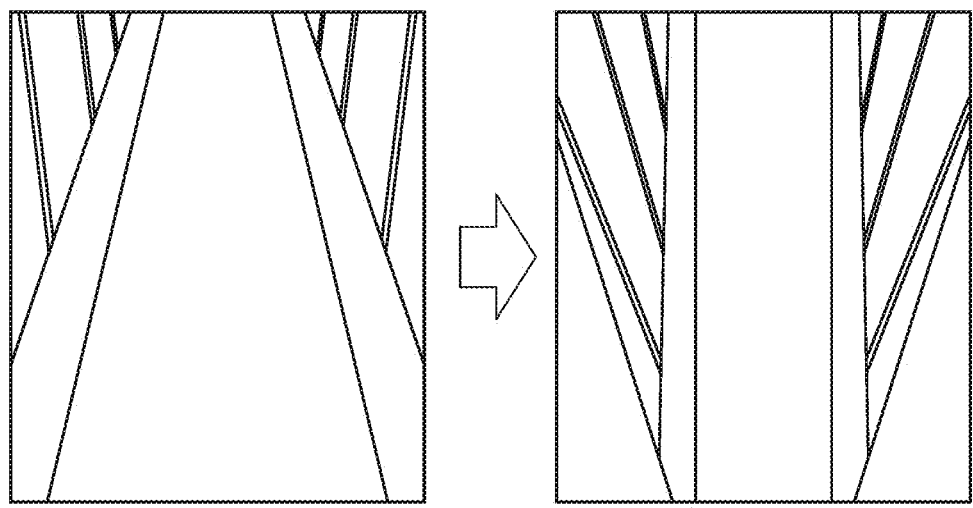
FIG. 3 show parts of images used in the method and system for localizing the mobile robot using the external surveillance cameras according to the exemplary embodiment of the present invention, in which the left side of FIG. 3 shows an image obtained from the external surveillance camera, and the right side of FIG. 3 shows an air view converted through a homography scheme.

FIG. 3 show parts of images used in the method and system for localizing the mobile robot using the external surveillance cameras according to the exemplary embodiment of the present invention. Left side of FIG. 3 is an image acquired from the external surveillance camera, and right side of FIG. 3 is an air view converted from two images which are merged into one image through a homography scheme.

A corridor image obtained from the surveillance camera as shown in left side of FIG. 3 is projection-converted using the homography scheme to match coordinates of a specific location on the image with coordinates of a real corridor, so that the corridor image is converted into the air view such as a bird eye view.

Figure 4:
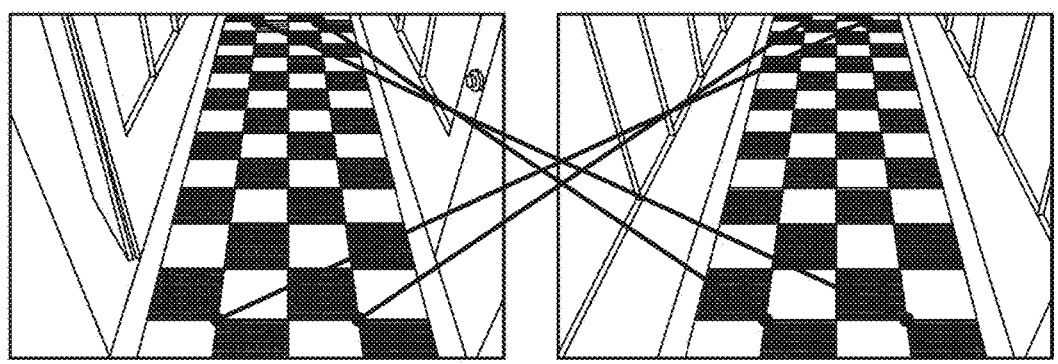
FIG. 4 are views showing the procedure of detecting feature points Q on a common region from images obtained by the two cameras using a chess board-shaped placard for projection-conversion.

FIG. 4 are views showing the procedure of detecting feature points Q on a common region from images obtained by the two cameras using a chess board-shaped placard for projection-conversion.

In order to perform projection-conversion like the air view shown in right side of FIG. 3, coordinates of a feature point Q of an existing image and coordinates of a corresponding point q of a new image plane must be determined. Left side and Right side of FIG. 4 are views showing the procedure of detecting a feature point Q of a common region using a chess board-shaped placard to projection-convert images obtained from the two facing cameras.

In the chess board shown in right side of FIG. 4, the size of one square is 45×45 cm$^2$, and the distance between feature points corresponds to two squares (90 cm) widthwise of the corridor, and 12 squares (540 cm) lengthwise of the corridor. According to the present invention, in order to normalize image information, the coordinates of points q corresponding to points Q are configured at an interval of one pixel per 1 cm. The size of each square in the chess board and the length of the corridor may be adjusted if necessity.

Figure 5A:
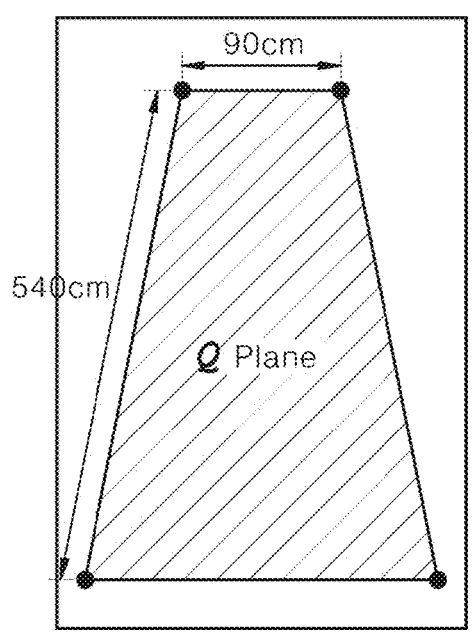
FIG. 5A and FIG. 5B are views showing parts of images used in the method and system for localizing the mobile robot using the external surveillance cameras according to the exemplary embodiment of the present invention.
Figure 5B:
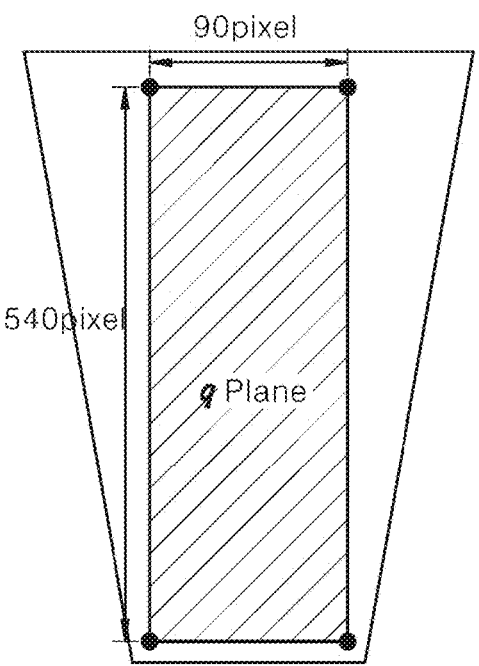

FIG. 5A and FIG. 5B are views showing parts of images used in the method and system for localizing the mobile robot using the external surveillance cameras according to the exemplary embodiment of the present invention. FIG. 5A shows a plane Q of an original image, and FIG. 5B shows a plan q of the air view image.

Figure 6:
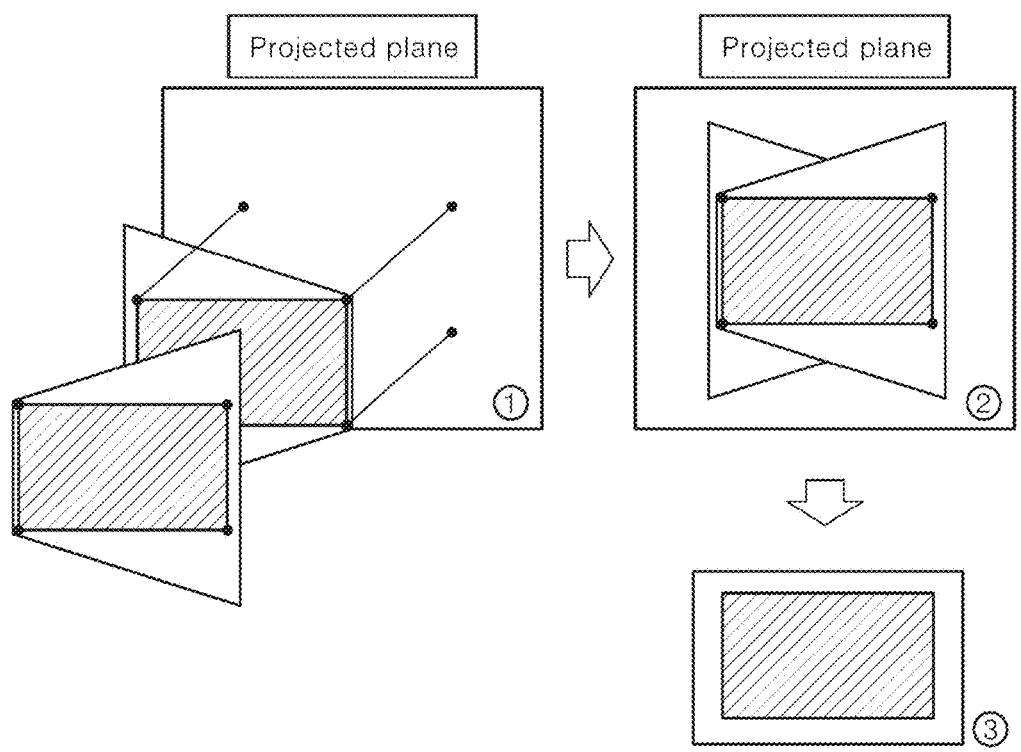
FIG. 6 shows a part of the images used in the method and system for localizing the mobile robot using the external surveillance cameras according to the exemplary embodiment of the present invention, and, in detail, shows the procedure of extracting a 2-D map from two projected images through the homography scheme.

FIG. 6 shows a part of the images used in the method and system for localizing the mobile robot using the external surveillance cameras according to the exemplary embodiment of the present invention, and shows the procedure of extracting a 2-D map from two projected images through the homography scheme.

A 3×3 homography matrix H may be found using four points of the plan Q and four points of the plan q, which are found out as shown in FIG. 5A and FIG. 5B. Following Equation 1 is used to calculate the homography matrix, and applied to the four points of the plan Q and the four points of the plan q, so that the homography matrix H may be obtained.

$$q = HQ \qquad \text{Equation 1}$$

In Equation 1, q and Q represent the planes q and Q, respectively.

If coordinates of feature points of two images, which are projection conversion results through the homography scheme, are combined and expressed to coordinates of a new projected plane as expressed by reference number ① of FIG. 6, the result expressed by reference number ② of FIG. 6 may be obtained. When a corridor region to be actually used is extracted as a region of interest (ROI) from the projected image, a 2-D map may be found as expressed by reference number ③ of FIG. 6.

Figure 7:
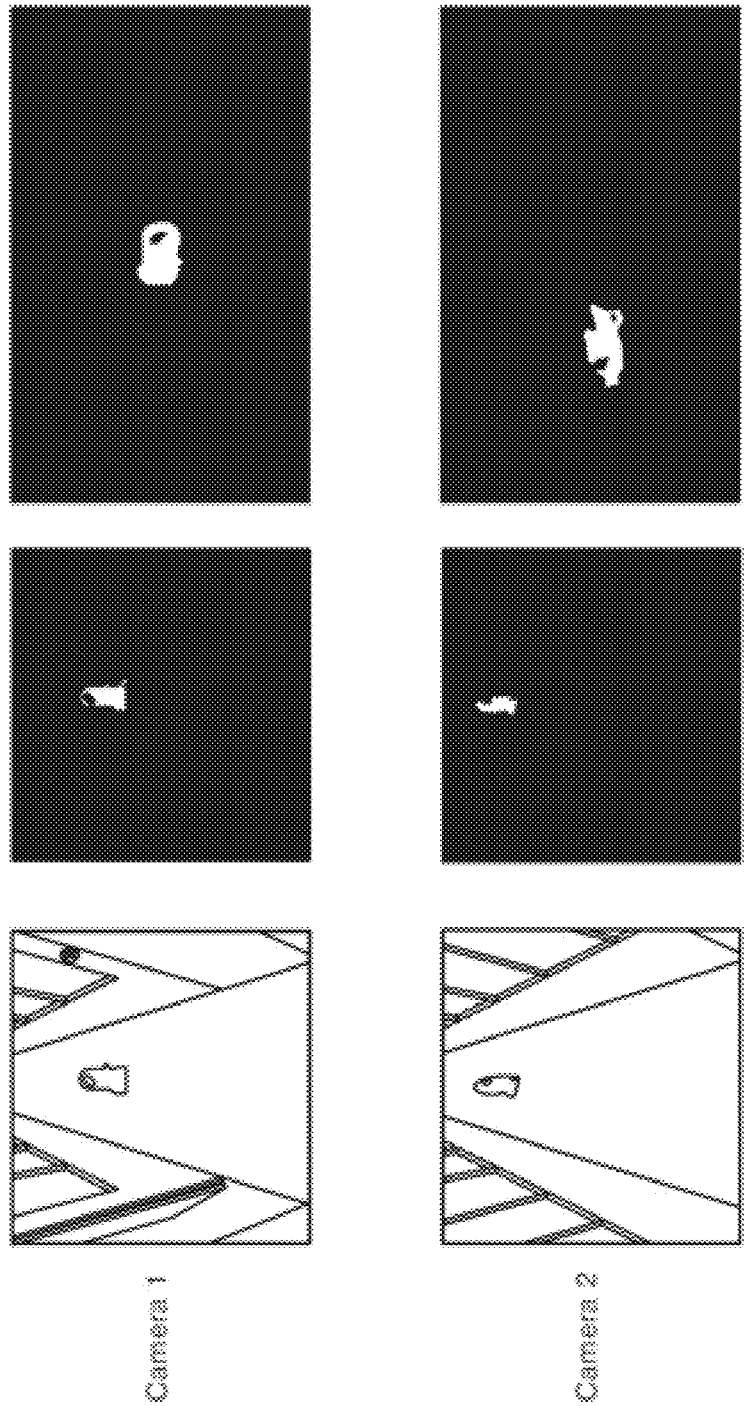

FIG. 7A, FIG. 7B and FIG. 7C show homography projection images by two surveillance cameras among images used in the method and system for localizing the mobile robot using the external surveillance cameras according to the exemplary embodiment of the present invention, in which FIG. 7A shows original images of the surveillance cameras, FIG. 7B shows binary images obtained by removing a shadow effect from the original images of FIG. 7A, and FIG. 7C shows images obtained by projecting the images of FIG. 7B through the homography scheme.

In order to find out an object bottom region on the 2-D map, the original images of the surveillance cameras are acquired as shown in FIG. 7A, the binary images are obtained by removing the shadow effect from the original images of FIG. 7A as shown FIG. 7B, and the homography projection images are obtained by projecting the images of FIG. 7B through the homography scheme as shown in FIG. 7C.

Next, the central position and the size of an object image in the 2-D map must be calculated.

On the assumption that coordinates of two projection-converted images approximate to each other, the size and the location of the object in contact with a floor included in the image may be substantially matched with those of an object in a real environment. Accordingly, if overlapped image parts are removed from two images except for image parts in close contact with the floors of two images, an effect that the objects are viewed from the top similarly to a bird eye view may be produced Following Equation 2 is used for the homography projection.

In this case, on the assumption that a projected image of an image by camera 1 is $I_1^H(x,y)$, and a projected image of an image by camera 2 is $I_2^H(x,y)$, the size and the location of an object on a projected plane are produced by Equation 2.

$$H(x, y) = \begin{cases} 1, & \text{if } [I_1^H(x, y) \,\&\, I_2^H(x, y)] = 1 \\ 0, & \text{otherwise} \end{cases} \qquad \text{Equation 2}$$

In Equation 2, $I_1^H(x,y)$ and $I_2^H(x,y)$ represent the projected images by camera 1 and camera 2, respectively.

Figure 8:
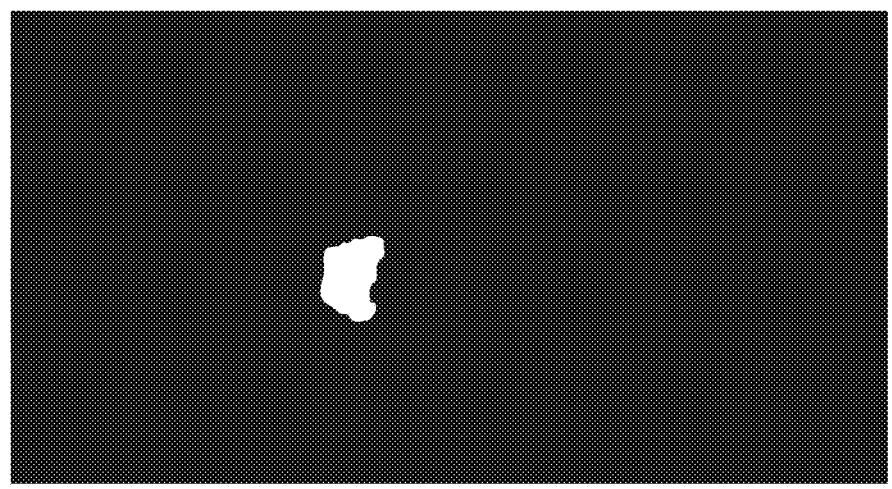
FIG. 8 shows a part of images used in the method and system for localizing the mobile robot using the external surveillance cameras according to the exemplary embodiment of the present invention, and in detail, shows a common region of the projected images of the images by cameras 1 and 2 shown in FIG. 7C.

FIG. 8 shows a part of images used in the method and system for localizing the mobile robot using the external surveillance cameras according to the exemplary embodiment of the present invention, and in detail, shows a common region of the projected images of the images by cameras 1 and 2, which represents an object on the 2-D map through the homography scheme.

FIG. 8 shows that a robot is located on a corridor when viewed on the 2-D map based on the created homography image. Camera 1 is located at the left side of FIG. 8, and camera 2 is located at the right side of FIG. 8. The image created in such a manner may show an effect that an object is viewed downward from the ceiling.

In order to detect information of each object from the image, following procedures are performed.

First, an object region is detected. In order to detect the object from the image, a labeling or contour scheme is typically used. The schemes are appropriate to the detection of the object region from the image of FIG. 8 since binary images are received as inputs. According to the present invention, the contour scheme is used to detect only an outline for rapid processing. The information of the outline of each object is stored in a memory storage through the contour scheme. According to the exemplary embodiment of the present invention, a memory storage integrated with the control unit 100 is used.

Second, a moment is calculated in order to calculate the central coordinates and the area of the object region. The moment is used when the size of the object region is calculated. According to the present invention, the size and the central coordinates of the object are calculated based on the information of the outline found through the contour scheme.

Figure 9:
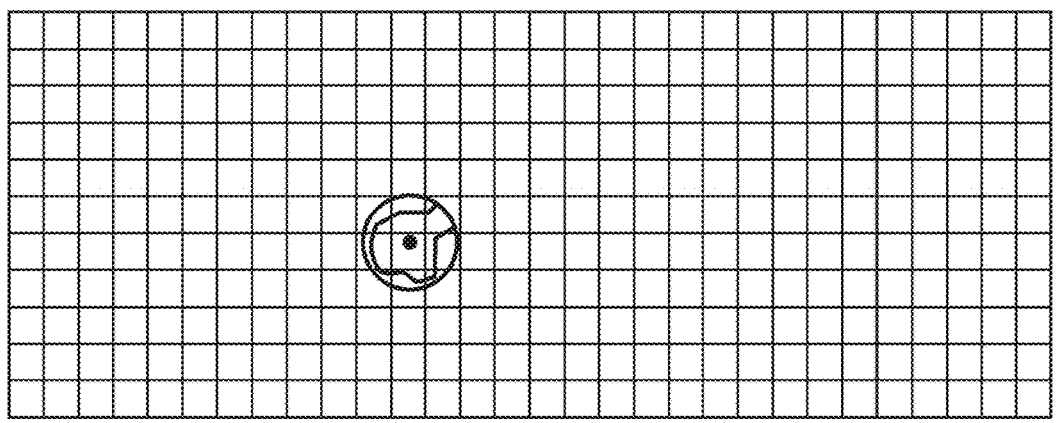
FIG. 9 shows a part of the images used in the method and system for localizing the mobile robot using the external surveillance cameras according to the exemplary embodiment of the present invention, and in detail, show a 2-D map image obtained by merging the object region with a projected floor image.

In order to compare the location of the object region of FIG. 8 with that of a real object, the image of a real corridor is projection-converted to make a map and the information of an object detected through the contour scheme is expressed as shown in FIG. 9.

FIG. 9 shows a part of the images used in the method and system for localizing the mobile robot using the external surveillance cameras according to the exemplary embodiment of the present invention, and in detail, show a 2-D map image obtained by merging the object region with a projected floor image.

When the size and the central location of the object region obtained through the contour scheme are compared with the size and the central location of a real object, errors are greatly made. Accordingly, the difference in location between the detected object and the real object is measured through image processing based on the lattice shown in FIG. 10A and FIG. 10B.

Figure 10A:
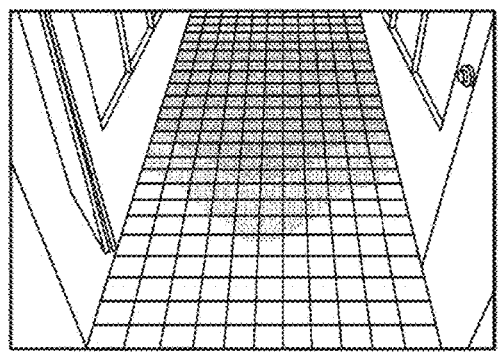
Figure 10B:
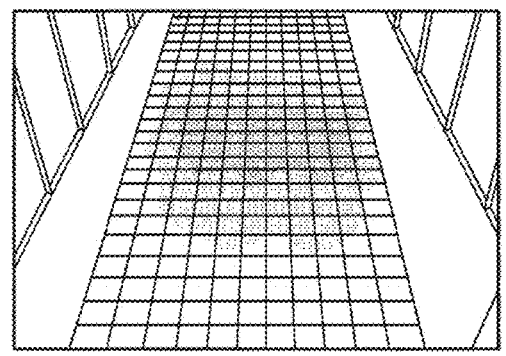

FIG. 10A and FIG. 10B show parts of the images used in the method and system for localizing the mobile robot using the external surveillance cameras according to the exemplary embodiment of the present invention, and in detail, show lattice images used to measure the location error of the object region which is visually detected, in which FIG. 10A shows an image by camera 1, and FIG. 10B is an image by camera 2.

Figure 11:
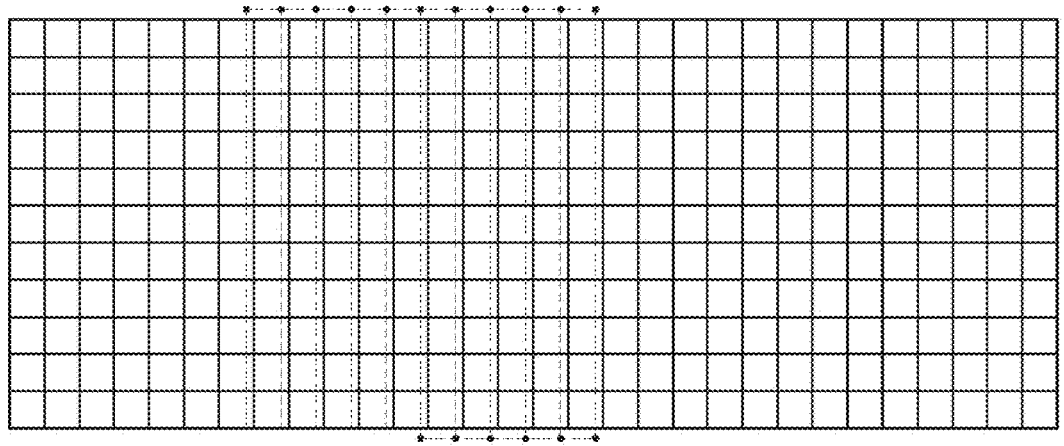
FIG. 11 shows a part of the images used in the method and system for localizing the mobile robot using the external surveillance cameras according to the exemplary embodiment of the present invention, and in detail, shows an error compensation result image for the object region detected through the homography scheme.

In order to an error measurement experiment, a cylindrical object having a diameter of 20 cm is used. The primary measurement error compensation in the detection of the object region is performed through the homography scheme. The error bound is 7.1 cm on the 2-D map obtained by mapping a grid image detected through image processing with the floor image on the air view. FIG. 11 shows an error compensation result for the object region detected through the homography scheme.

FIG. 11 shows a part of the images used in the method and system for localizing the mobile robot using the external surveillance cameras according to the exemplary embodiment of the present invention, and in detail, shows an error compensation result image for the object region detected through the homography scheme.

Figure 12:
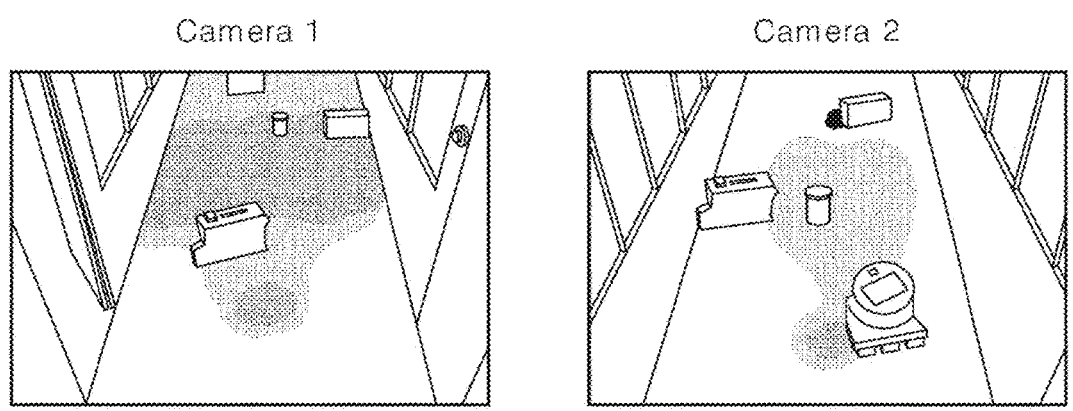
FIG. 12 show parts of the images used in the method and system for localizing the mobile robot using the external surveillance cameras according to the exemplary embodiment of the present invention, and in detail, show images obtained by photographing an experimental environment, in which several objects are placed, by the surveillance cameras.

FIG. 12 show parts of the images used in the method and system for localizing the mobile robot using the external surveillance cameras according to the exemplary embodiment of the present invention, and in detail, show images obtained by photographing an experimental environment, in which several objects are placed, by the surveillance cameras. The mobile robot is controlled to move from one position to another position.

In this case, as shown in FIGS. 2 to 11, and as described using Equations 1 and 2, the mobile robot having the system 1000 employing the method of localizing the mobile robot using the external surveillance cameras detects objects, which are placed on a floor, as object regions, recognizes the objects as obstacles, determines a moving path, and moves. According to the present invention, although the mobile robot may determine the moving path for itself, an external system such as a server may determine the moving path.

Figure 13:
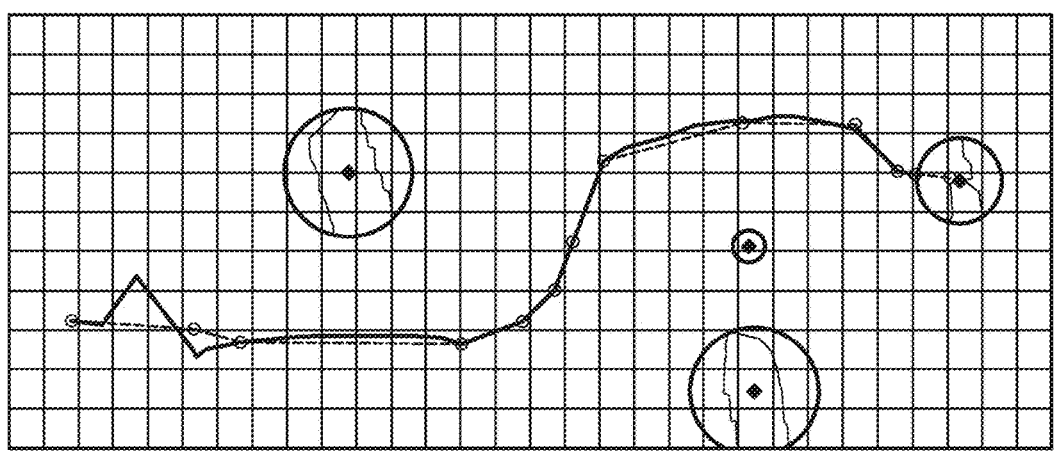
FIG. 13 is a view showing a path control experiment result of the mobile robot employing the method and system for localizing the mobile robot using the external surveillance cameras according to the exemplary embodiment of the present invention.

FIG. 13 is a view showing a path control experiment result of the mobile robot employing the method and system for localizing the mobile robot using the external surveillance cameras according to the exemplary embodiment of the present invention.

The error bound is ±5 cm between the moving path planned by the mobile robot employing the method and system for localizing the mobile robot using the external surveillance cameras according to the exemplary embodiment of the present invention, and an actual traveling path that the mobile robot actually moves.

In this case, the mobile robot may calculate the error bound between the planned moving path and the traveling path that the mobile robot actually moves, and may transmit the calculated result to a specific external system. The external system, which is a computing system specified by a user of the mobile robot, may be a personal computer system, or a computer system for service, such as a server.

FIG. 14 is a schematic view showing the mobile robot employing the method and system for localizing the mobile robot using the external surveillance cameras according to the exemplary embodiment of the present invention, and the driving unit of the mobile robot. The details of the mobile robot and the driving unit thereof have been incorporated in the description made with reference to FIG. 1.

As described above, although exemplary embodiments of the present invention have been described, various embodiments disclosed in "DETAILED DESCRIPTION OF THE INVENTION" are provided only for the illustrative purpose. Those skilled in the art can understand that various modifications, variations, and equivalents of the present invention are possible based on the above description.

In addition, since the present invention can be realized in various forms, the present invention is not limited to the above embodiments. The above description is provided only to allow those skilled in the art to perfectly understand the scope of the present invention, and those skilled in the art should know that the present invention is defined by the appended claims.

What is claimed is:

1. A system for localizing a mobile robot using external surveillance cameras, the system comprising:
   a control unit that recognizes an object and an obstacle included in received surveillance camera images through a shadow removing scheme and a homography scheme, creates a moving path to allow travelling while avoiding the object and the obstacle, and generates a corresponding control signal to control components other than the control unit;
   a sensing unit that senses a steering angle and rotation of a driving motor and transmits the steering angle and the rotation of the driving motor to the control unit;
   a traveling unit that generates driving force by the control signal;
   a steering unit that performs steering along the moving path by the control signal;
   a communication unit that transmits images, which are obtained from the surveillance cameras, to the control unit; and
   a power supply unit that supplies power to components other than the power supply unit.

2. The system of claim 1,
   further comprising a proximity sensor or a distance sensor provided on one side of an outer portion of a shadow removing system.

3. The system of claim 1,
   wherein a communication protocol applied to the communication unit is a Zigbee wireless communication protocol.

4. The system of claim 1,
wherein one wireless communication protocol or a plurality of wireless communication protocols are applied to the communication unit.

5. The system of claim 1,
wherein the traveling unit comprises a moving unit including a wheel, a caterpillar, or a leg for walking.

6. The system of one of claim 1,
wherein the sensing unit comprises a camera or a vision sensor.

7. The system of one of claim 2,
wherein the sensing unit comprises a camera or a vision sensor.

8. The system of one of claim 3,
wherein the sensing unit comprises a camera or a vision sensor.

9. The system of one of claim 4,
wherein the sensing unit comprises a camera or a vision sensor.

10. The system of one of claim 5,
wherein the sensing unit comprises a camera or a vision sensor.

11. A method of localizing a mobile robot using external surveillance cameras, the method comprising:
converting original images acquired from indoor surveillance cameras installed adjacent to each other to binary images and removing shadows from the binary images;
merging the binary images having no shadows with each other through a homography scheme;
recognizing locations and sizes of objects included into the original images through a contour scheme; and
compensating for errors of the recognized locations and sizes of the objects, and mapping the objects having the compensated locations and sizes with an image of a real floor, which is merged with a grid.

12. The method of claim 11,
wherein, in the merging of the binary images having no shadows with each other through the homography scheme,
Equations 1 and 2 are applied to the binary images having no shadows, $$q = HQ, \quad \text{Equation 1}$$

in which q and Q represent planes q and Q, respectively, in Equation 1, and $$H(x, y) = \begin{cases} 1, & \text{if } [I_1^H(x, y) \& I_2^H(x, y)] = 1 \\ 0, & \text{otherwise} \end{cases} \quad \text{Equation 2}$$

in which $I_1^H(x,y)$ and $I_2^H(x,y)$ represent projected images by camera 1 and camera 2, respectively, in Equation 2.

13. The method of claim 11,
further comprising planning a moving path based on the mapping after the mapping of the objects having the compensated locations and sizes.

14. The method of claim 12,
further comprising planning a moving path based on the mapping after the mapping of the objects having the compensated locations and sizes.

15. The method of claim 13,
further comprising:
marking the planed moving path and an actual traveling path on a same map and calculating an error bound between the moving path and the traveling path; and
transmitting the error bound to an external system,
after the planning of the moving path and the actual traveling of the mobile robot along the planed moving path.

16. The method of claim 14,
further comprising:
marking the planed moving path and an actual traveling path on a same map and calculating an error bound between the moving path and the traveling path; and
transmitting the error bound to an external system,
after the planning of the moving path and the actual traveling of the mobile robot along the planed moving path.

17. The method of claim 15,
wherein a square lattice or grid including gradations spaced at a predetermined interval is displayed together with the moving path and the traveling path on the map having the planed moving path and the actual traveling path that are marked thereon.

18. The method of claim 16,
wherein a square lattice or grid including gradations spaced at a predetermined interval is displayed together with the moving path and the traveling path on the map having the planed moving path and the actual traveling path that are marked thereon.

19. The method of claim 15,
wherein the external system, to which the error bound is transmitted, stores and processes error bounds transmitted from a plurality of mobile robots, and transmits the stored error bound or a processing result to an outside.

20. The method of claim 16,
wherein the external system, to which the error bound is transmitted, stores and processes error bounds transmitted from a plurality of mobile robots, and transmits the stored error bound or a processing result to an outside.

* * * * *